United States Patent
Schiek et al.

(10) Patent No.: US 8,403,264 B2
(45) Date of Patent: Mar. 26, 2013

(54) AIR INLET VALVE FOR AN AIRPLANE AND MANUFACTURING METHOD FOR AN AIR INLET VALVE

(75) Inventors: Thorsten Schiek, Hamburg (DE); Markus Petrac, Deinste (DE); Thomas Scherer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 223 days.

(21) Appl. No.: 12/948,877

(22) Filed: Nov. 18, 2010

(65) Prior Publication Data

US 2011/0147633 A1 Jun. 23, 2011

Related U.S. Application Data

(63) Continuation of application No. PCT/EP2009/056782, filed on Jun. 3, 2009.

(60) Provisional application No. 61/130,884, filed on Jun. 4, 2008.

(30) Foreign Application Priority Data

Jun. 4, 2008 (DE) .................. 10 2008 002 205

(51) Int. Cl.
*B64C 1/14* (2006.01)
*F02K 1/12* (2006.01)
*F02K 1/38* (2006.01)

(52) U.S. Cl. ............... 244/129.4; 244/53 B; 244/58; 244/129.5; 137/15.1; 137/15.2

(58) Field of Classification Search ............... 244/53 B, 244/58, 129.4, 129.5; 137/15.1, 15.2
See application file for complete search history.

(56) References Cited

U.S. PATENT DOCUMENTS

| 962,330 | A | * | 6/1910 | Fischer ........................ 16/279 |
| 2,463,490 | A | * | 3/1949 | Kemper ........................ 454/74 |
| 4,174,083 | A | * | 11/1979 | Mohn ........................ 244/53 B |
| 5,046,686 | A | | 9/1991 | Carla et al. |
| 6,293,494 | B1 | | 9/2001 | Scherer et al. |
| 7,832,684 | B2 | | 11/2010 | Scherer et al. |

FOREIGN PATENT DOCUMENTS

| DE | 19850093 C1 | 5/2000 |
| DE | 10145687 A1 | 4/2003 |
| DE | 10216969 A1 | 10/2003 |
| DE | 10361722 A1 | 8/2005 |
| EP | 0342069 A1 | 11/1989 |
| WO | WO 01/62592 | 8/2001 |
| WO | WO 2005/063579 | 7/2005 |

OTHER PUBLICATIONS

Frick, Charles W. et al., "An experimental investigation of NACA submerged-duct entrances," National Advisory Committee for Aeronautics, Washington, Oct. 1945.
German Office Action for DE 10 2008 002 205.5 dated Jun. 9, 2009.
International Search Report and Written Opinion for PCT/EP2009/056782 dated Sep. 21, 2009.

* cited by examiner

*Primary Examiner* — Tien Dinh
*Assistant Examiner* — Michael Wang
(74) *Attorney, Agent, or Firm* — Jenkins, Wilson, Taylor & Hunt, P.A.

(57) ABSTRACT

The present invention provides an air intake valve for an aircraft and a method for the production of an air intake valve. The air intake valve has an opening region for letting ambient air through into a fuselage inner region of the aircraft and a flap for opening and closing the opening region, the opening region and the flap each having a shape which is capable of forming air vortices on edges of the opening region when ambient air flows through the air intake valve.

14 Claims, 7 Drawing Sheets

FIG 6
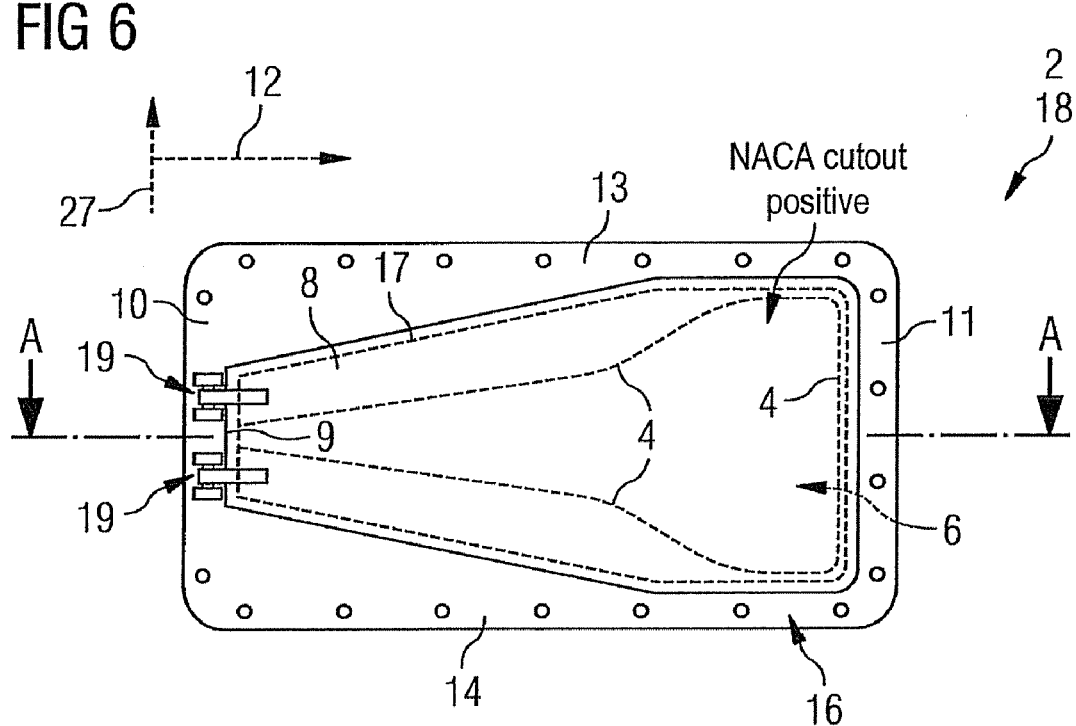
FIG 7  Section A-A
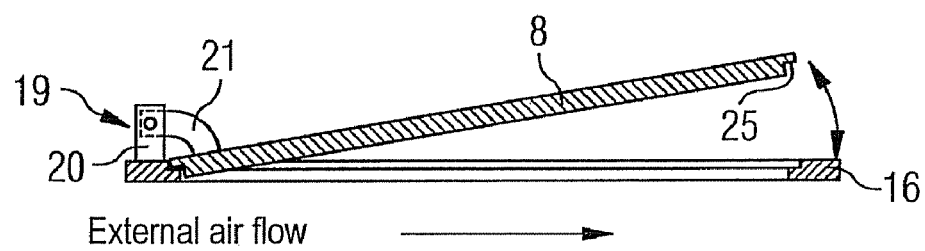
External air flow →
FIG 8  Section A-A
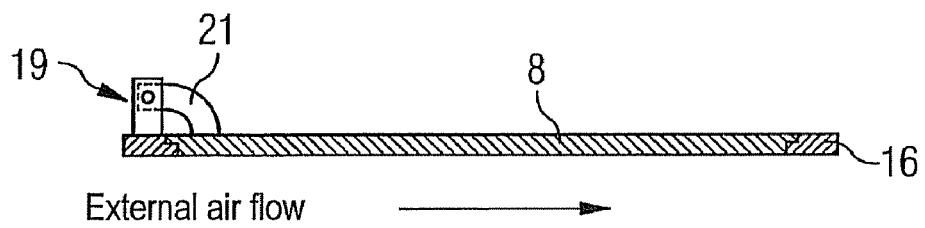
External air flow →

US 8,403,264 B2

AIR INLET VALVE FOR AN AIRPLANE AND MANUFACTURING METHOD FOR AN AIR INLET VALVE

CROSS-REFERENCE TO RELATED APPLICATIONS

This application is a continuation of PCT/EP2009/056782 filed Jun. 3, 2009, which claims the benefit of U.S. Provisional Application No. 61/130,884, filed Jun. 4, 2008 the entire disclosures of which are herein incorporated by reference.

FIELD OF THE INVENTION

The invention relates to a flow-optimised air intake valve for an aircraft according to the preamble of claim 1 and to a method for the production of an air intake valve of this type according to the preamble of claim 26. The invention provides a flow-optimised air intake valve which is positioned in the region of a submerged air inlet and is constructed to be self-regulating under the influence of the force conditions acting thereon in an air pressure-loading manner. The use of the air intake valve produces an optimisation, adapted to the aerodynamic flow conditions, of the air flowing into the submerged air inlet during an air pressure equalisation which takes place between the outer environment of the aircraft and the interior of the aircraft fuselage.

A conventional aircraft fuselage is constructed as a pressure fuselage. In this respect, the static air pressure inside the fuselage must be greater than the air pressure outside the environment of the aircraft. For safety reasons, air valves are installed in the outer skin of the aircraft which operate independently and which produce a pressure equalisation in the (assumed) situation of an occurring inverse differential pressure between the pressure-ventilated inner region of the fuselage (cabin and hold region) and the outer region of the fuselage loaded by an atmospheric ambient pressure. If it is assumed that the atmospheric ambient air pressure (external air pressure) is greater than the air pressure inside the fuselage (internal air pressure), an air intake valve which is installed in the outer skin of the fuselage (or so-called outer skin valve) will be activated.

Known air pressure equalising valves of this type operate such that (initially) when a certain inversely-acting differential pressure is exceeded, it is observed that the (resulting) force from a static external air pressure which is loaded on a valve cover outside the aircraft fuselage is greater than a (so-called) closing force (compression force) of springs positioned inside the aircraft skin and which press perpendicularly against the edges of a plate. As a result of this, the valve opens and air flows from the environment outside the aircraft fuselage to the inner region of the fuselage and produces an air pressure equalisation. The inflow of this air is not optimised by the adjustment of any measures. A more detailed description will be provided later on in the embodiments of conventional construction solutions which relate to an air intake valve (installed in "Boeing" types of aircraft) and an air pressure equalising valve (installed in "Airbus" types of aircraft), the installation of which is performed to equalise inverse differential pressures arising between the pressure-ventilated fuselage region and the region outside the fuselage loaded by an atmospheric ambient pressure and which are arranged in the region of air inlets integrated into the aircraft skin, to simplify to experts the comparison with a flow-optimised air intake valve which will be described in more detail.

As is known, the products "Airbus A330/A340" and "Boeing 737" are fitted with valves of this type.

In this respect, it is a disadvantage that the actual air flow which enters the aircraft fuselage via these mentioned valves under inverse pressure conditions is greatly influenced by the external air flow (surrounding the aircraft fuselage) (by the type of valves) and thus cannot effectively be determined without an expensive series of tests being carried out in the aircraft.

FIG. 1 shows (in a side view) a conventional flow-optimised air intake valve 2. It is arranged in the region of a submerged air inlet 1 which is in a position closing the opening region 6 of the submerged air inlet 1. It consists of a side frame 16 which is arranged resting sideways against the submerged air inlet wall region and covers the cross section of the opening region 6 at least at the inlet of the submerged air inlet 1. This side frame 16 is adapted to a cross section, kept clear (above the opening region 6) of the fuselage outer skin 15 of the aircraft and is attached to the fuselage outer skin 15. The side frame 16 consists of planar sheet metal plate elements or planar supports (plank elements) which, in the following, are termed transverse and longitudinal sides 10, 11, 13, 14. This side frame 16 comprises two transverse sides 10, 11 and two longitudinal sides 13, 14, the ends of which are connected together mechanically and form a rectangular side frame 16 (according to FIG. 2).

Mounted at the start of the incipient bevel of the base of the submerged air inlet 1 is a (rotatably mounted) flap 8 which can be inclined towards the inner region 7 of the fuselage (opening outlet of the submerged air inlet 1) and is rotatably attached to at least one spring hinge 19 secured to the frame. The flap movement is indicated in FIG. 1 by an arrow marked "open/closed". The flap 8 rests on a groove-like recess arranged on the inside of the frame and placed around the periphery of the frame, a strip-like sealing attachment 17 (sealing strip) placed on this recess sealing the edge of the flap 8 in a manner impermeable to gas (in this situation) against the side frame 16 insofar as the flap 8 rests against the groove-like frame recess and presses against the sealing attachment 17 when, in an air-pressure ratio, the internal air pressure $p_i$ is greater than or equal to the atmospheric external air pressure $p_a$, which will be explained in more detail later on.

Furthermore, with a low pressure of the fuselage air compared to the ambient air pressure $p_a$ when the internal air pressure $p_i$ is less than the ambient air pressure $p_a$, the flap 8 will alternatively clear the opening region 6 of the submerged air inlet 1 such that it lets air flow through (by the flap 8 which is then inclined with respect to the inner region 7 of the fuselage). It is additionally pointed out that the internal air pressure $p_i$ is a static cabin pressure and the atmospheric ambient air pressure $p_a$ is a static external pressure of the (fuselage external air loaded on the aircraft fuselage in the region of the submerged air inlet 1). If the flap 8 is in an open state, part of the external air flow will pass into the opening region 6 (due to the shape and arrangement of the submerged air inlet 1). Reference is also made to FIG. 2 which shows a plan view of the valve arrangement according to FIG. 1.

SUMMARY OF THE INVENTION

The object of the invention is therefore to provide a solution for a flow-optimised air intake valve of an aircraft which is arranged in the region of a submerged air inlet, with which the aircraft is fitted to equalise inversely-acting differential air pressures. The air intake valve is to ensure a self-regulating, free passage of air into the inner region of the aircraft fuselage under the influence of the force conditions acting thereon in an air pressure-loading manner, and equally an optimisation, adapted to the aerodynamic flow conditions, of the air flowing into the submerged air inlet is effected during an air pressure equalisation which takes place between the external environment of the aircraft and the interior of the aircraft fuselage.

This object is achieved by an air intake valve which has the features of claim 1 and/or by a method which has the features of claim 27. The further claims contain advantageous developments and embodiments of these measures.

BRIEF DESCRIPTION OF THE DRAWINGS

In the following, the invention will be described in more detail on the basis of embodiments with reference to the accompanying figures.

In the figures:

FIG. 6 shows a flow-optimised, self-regulating air intake valve which closes the opening region of the NACA submerged air inlet according to FIG. 3 lying flat with respect to the surface of the aircraft outer skin;

FIG. 7 is a side view of the air intake valve according to FIG. 6 in an open position;

FIG. 8 is a side view of the air intake valve according to FIG. 6 in a closed position;

DESCRIPTION OF EXEMPLARY EMBODIMENTS

Figure 3:
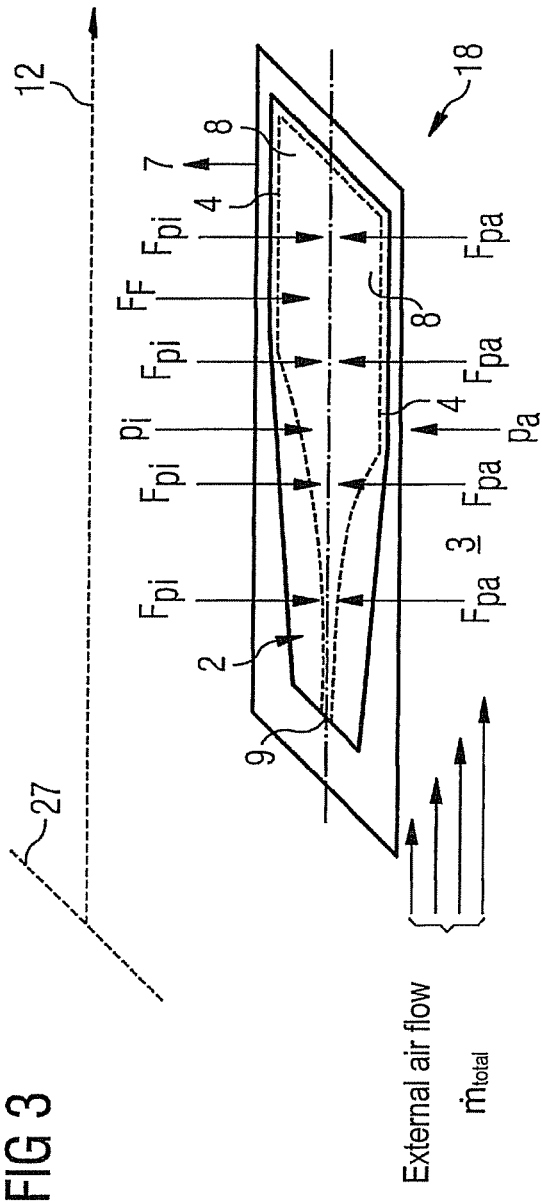
FIG. 3 shows an air intake valve in the closed state in the region of an NACA submerged air inlet according to the invention.
Figure 4:
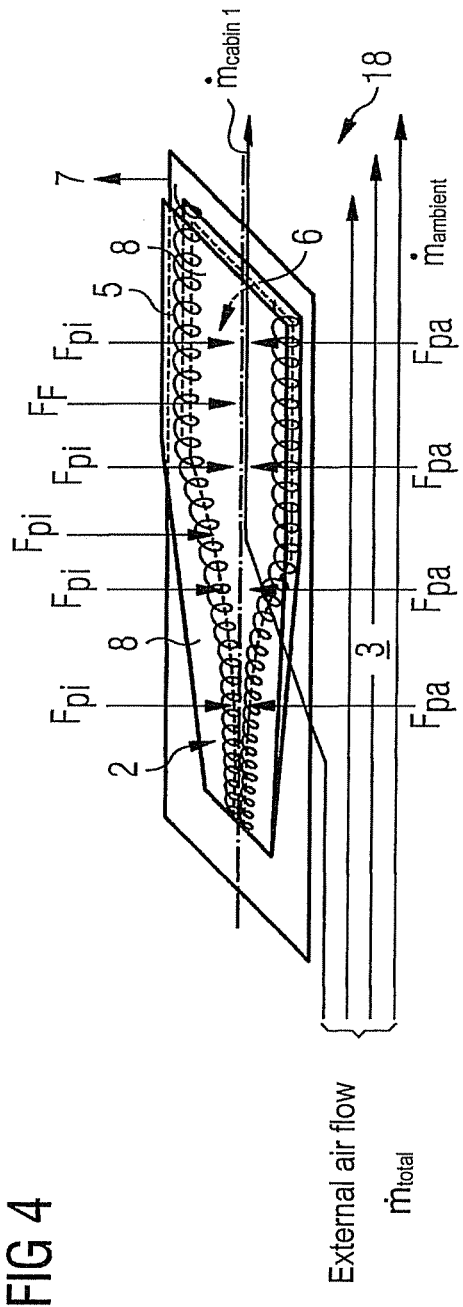
FIG. 4 shows the formation of edge vortices on the cutout edges of the opening cross section of the air-receiving (pressure-equalising) NACA submerged air inlet according to FIG. 3.
Figure 5:
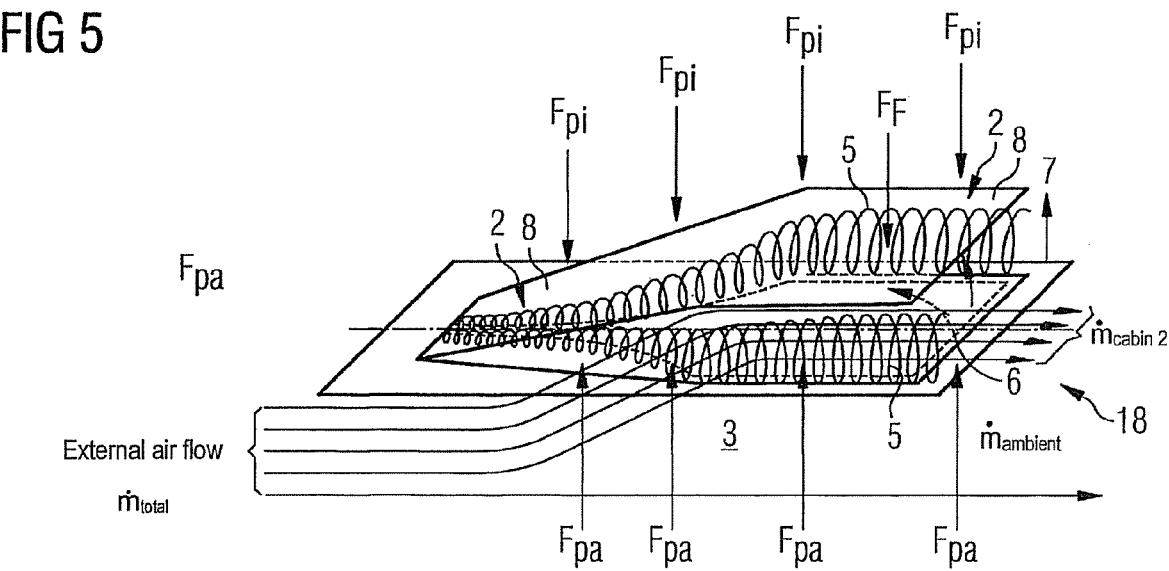
FIG. 5 shows the intensification of the edge vortices on the cutout edges of the opening cross section of the NACA submerged air inlet and on the edges of a valve-integrated flap according to FIG. 4.

FIG. 3 to 5 show an embodiment of an air intake valve 2 according to the invention which is positioned in the region of a submerged air inlet 1 and is advantageously arranged in an NACA submerged air inlet 18, due to vortex (pair) formation. This development of air vortices 5, that is to say pairs of air vortices, can be observed particularly in the case of submerged air inlets 1 which have an NACA shape. In this respect, it will be observed, on the example of the valve arrangement according to FIG. 3 to 5, that the initial air vortex formation is intensified on the cutout edges 4 of the NACA submerged air inlet 1 by the (desirable) further supply of ambient air 3 (outside the aircraft fuselage) into this NACA submerged air inlet 18, which air vortex formation will continue on the periphery of the edge(s) of the flap 8 provided that the flap 8 (adapted to the NACA opening cross section) is in an open position.

Figure 1:
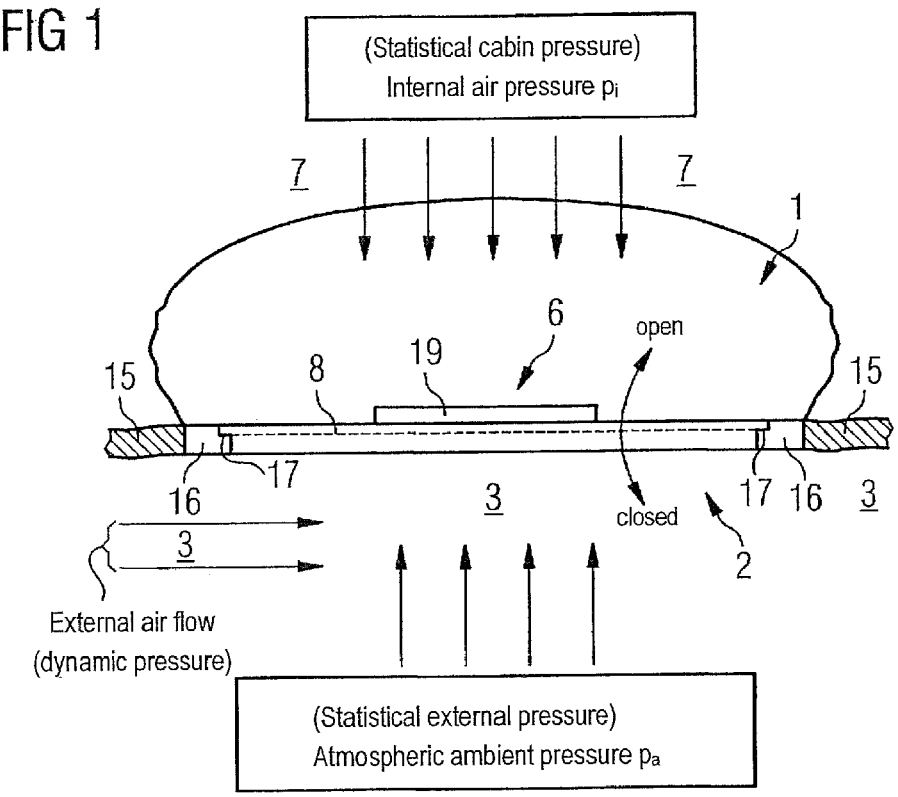
FIG. 1 is a side view of a conventional air intake valve in a closed state, which is fitted in the "Boeing 737" type of aircraft.
Figure 2:
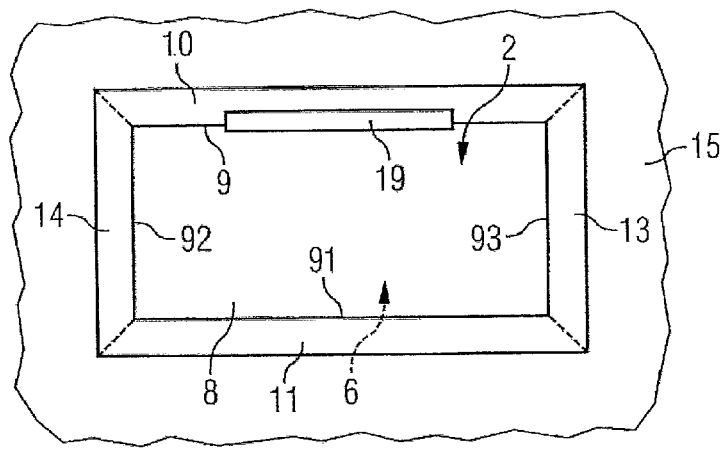
FIG. 2 is a plan view of the air intake valve according to FIG. 1.

According to the arrangement of FIG. 3 which differs from FIGS. 1 and 2 in particular by the use of an NACA submerged air inlet 18 and of the NACA-adapted superficial shape of the flap 8 correlated therewith, the air intake valve 2 (which is similar in terms of construction) is in the closed state, with the flap 8 forming a planar surface with the fuselage outer skin 15 (not shown) of the aircraft. The force resulting from the (non-inversely acting) differential air pressure $\Delta p$ [where $\Delta p = p_i - p_a$, and $p_a < p_i$ (cabin air excess pressure)] and the spring force $F_F$ added thereto of a compression spring of the spring hinge 19 (mentioned in respect of FIG. 1) which is shown for the first time in FIG. 6, acts on the flap 8 of this air intake valve 2 and keeps it closed, the relationship: $\Sigma F_{pi} + F_F > \Sigma F_{pa} \rightarrow \dot{m}_{cabin} = 0$ essentially describing this situation. Accordingly, no flow of ambient air 3 (fuselage external air) will develop in the direction of the internal regions of the aircraft from outside the aircraft fuselage via the NACA submerged air inlet 18. The air mass throughput $\dot{m}_{cabin}$ from the fuselage external air to, for example, the aircraft cabin equals zero.

Compared to FIG. 3, the arrangement of FIG. 4 shows a slightly open flap 8 (slightly inclined flap 8). The force resulting from the (inversely acting) differential air pressure $\Delta p$ [where $\Delta p = p_i - p_a$, and $p_a > p_i$ (cabin air low pressure)] and the spring force $F_F$ added thereto of the compression spring of the spring hinge 19 (mentioned in respect of FIG. 1) acts on the flap 8 of this air intake valve 2 and the flap 8 starts to open. The following relationships: $\Sigma F_{pi} + F_F < \Sigma F_{pa} \rightarrow \dot{m}_{cabin1} \neq 0$ and $\dot{m}_{total} = \dot{m}_{cabin1} + \dot{m}_{ambient}$ essentially describe this situation, and $(\Sigma F_{pa} = p_i \times A_{flap}) > \Sigma F_{pi} = \Sigma p_i \times A_{flap}) + F_F$ also applies. Accordingly, a flow of ambient air 3 (fuselage external air) will develop in the direction of the internal region 7 of the aircraft, from outside the aircraft fuselage via the flap 8 of the air intake valve 1 the NACA submerged air inlet 18, only a partial amount of the ambient air 3 being branched off into the NACA submerged air inlet 18. Air vortices 5 (so-called edge vortices) form at the edges of the opening cross section of the NACA submerged air inlet 18 and also suction up the boundary layer of the fuselage external air and, in so doing, help to guide the higher-energy flow outside the boundary layer as an air mass (partial) flow into, for example, the aircraft cabin.

Now to the arrangement of FIG. 5, which shows the flap 8 in a much further opened state compared to FIG. 4. The accumulated force resulting from the (inversely acting) differential air pressure $\Delta p$ [where $\Delta p = p_i - p_a$, and $p_a \gg p_i$ (cabin air low pressure)] and the spring force $F_F$ added thereto of the compression spring of the spring hinge 19 (mentioned in respect of FIG. 1) act on the flap 8 of this air intake valve 2 and as a result, the flap 8 opens further.

The following relationships: $\Sigma F_{pi} + F_F \ll F_{pa} \rightarrow \dot{m}_{cabin2} > \dot{m}_{cabin1}$ and $\dot{m}_{total} = \dot{m}_{cabint} + \dot{m}_{cabin2}$ essentially describe this situation. The greater $\Sigma F_{pa} = \Sigma p_a \times A_{flap}$ becomes in relation to $\Sigma F_{pi} = \Sigma p_i \times A_{flap}) + F_F$, the more the flap 8 opens and allows an increasing air flow to enter the aircraft cabin in particular. Accordingly, an increased flow of ambient air 7 (fuselage external air) develops in the direction of the inner regions of the aircraft from outside the aircraft fuselage via the flap 8 of the air intake valve 1, the NACA submerged air inlet 18. Air vortices 5 (so-called edge vortices) form on the edges 4 of the opening cross section of the NACA submerged air inlet 18 and continue (propagate to a certain extent) peripherally along the edges of the flap 8, as a result of which the air mass flow which has been guided, for example, into the aircraft cabin will start to increase. In this situation, the plate 8 acts a vortex- and flow multiplier.

Here, reference is made to the advantageous use of an NACA submerged air inlet 18 combined with the self-regulating (as a function of the prevailing air pressure conditions) air intake valve 2 which is adapted in a flow-optimised manner, according to which the air mass throughput $\dot{m}_{cabin1}$, $\dot{m}_{cabin2}$ (relating to the figures) will be substantially higher due to the NACA shape with an identical size of the fuselage scoop (located on the outlet side of the NACA submerged air inlet 18) and with the same installation space (of the NACA submerged air inlet 18), i.e. will mean a power increase of the partial air quantity of ambient air 3, guided via the NACA submerged air inlet 18. As a result of this increase in power, it is possible to reduce the number of air intake valves 1 to be originally installed in the aircraft fuselage (or in other intended aerodynamic outer skin regions of the aircraft) and thus to reduce the number of necessary cutouts or opening regions in the fuselage outer skin 15.

This also results in a reduction in the weight of the aircraft and consequently a lower fuel consumption.

The air intake valve 2 is preferably adjusted to a defined air mass throughput $\dot{m}_{cabin1}$, $\dot{m}_{cabin2}$ which depends on the current flight conditions and dimensions in order to make efficient use of the advantages mentioned.

Conceivable embodiments are shown in the further figures. Thus, FIG. 6 to 9 relate to the installation of a (flow-optimised) air intake valve 2, the defined arrangement of which can operate in a self-regulating manner in the region of an NACA submerged air inlet 18. In this respect, in its rest position the flap 8 seals off the opening region 6 of the NACA submerged air inlet 18 (shown in FIG. 3 to 5) lying flat with respect to the surface of the fuselage outer skin 15 of the aircraft such that it is impermeable to air (i.e. it seals in a gas-tight manner). It is impermeable to air because in the situation of an existing cabin excess pressure ($p_i > p_a$) or even when there is an equalised pressure relationship ($p_i = p_a$), the flap 8 presses against the sealing attachment 17 resting on the inner edge of the side frame 16.

Figure 9:
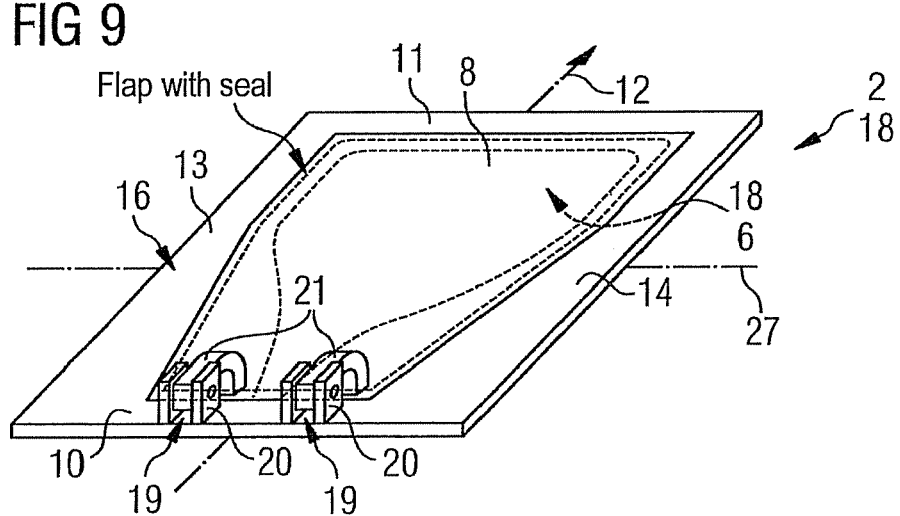
FIG. 9 shows the air intake valve according to FIG. 6 with boldly outlined valve components.

Furthermore, FIGS. 6 and 9 show two spring hinges 19 which are arranged on the surface region (directed towards the opening region 6) of the transverse side 10, configured as a planar plate or support element, of the side frame 16 (according to either of the aforementioned figures) and are attached in a mutual spacing to one another. Each spring hinge 19 has a first and second hinge portion 20, 21, the first hinge portion 20 being attached to the region, directed towards the base of the NACA submerged air inlet 18, of the said transverse side 10. The second hinge portion 21 can be mounted such that it can move by an articulated axle with respect to the first hinge portion 20 (in the direction of the fuselage transverse axis 27) and can be moved in a vertical direction of the fuselage longitudinal axis 12 inclined to the bevel of the base of the NAGA submerged air inlet 18.

The surface of the flap 8 which is attached to the second hinge portion 21 has a cut part which is adapted to the opening region 6 of the NACA submerged air inlet 18 and which completely covers the (positively) shown NACA cutout (in the rest position of the flap 8). Furthermore, integrated into the corresponding spring hinge 19 is a restoring spring, the respective spring end of which is coupled with the two hinge portions 20, 21. This restoring spring influences the hinge angle excursion of the two hinge portions 20, 21 such that in its relaxed position, the restoring spring does not store any restoring spring tension or exerts a spring force $F_F$ if the plate 8 is in its rest position. Only when the second hinge portion 21 is deflected into a vertically open position, does the restoring spring tension increase relative to the increase in the spring path. Thus, the maximum possible spring path of the restoring spring restricts the excursion of the second hinge portion 21 and thus also the permissible hinge angle excursion between the two hinge portions 20, 21.

The spring force $F_F$ which is thus provided and has already been mentioned in respect of FIGS. 3 to 5 is stored by the restoring spring as restoring spring force $F_F$, the assistance of which is used when the flap 8 is returned from its open position into a rest position.

Since the position of the flap 8 is substantially influenced by the currently prevailing air pressure conditions (or the currently active air pressure forces ($\Sigma F_{pi}$, $\Sigma F_{pa}$) on the effective surface ($A_{flap}$) of the flap 8, i.e. the pressure-loading internal air pressure ($\Sigma p_i$) and the ambient air pressure ($\Sigma p_a$) which both act as a function of pressure load on the opening cross section of the NACA submerged air inlet 18 (the spring force $F_F$ is disregarded for once) (cf. in this respect also the observations regarding FIG. 3 to 5), a self-regulating operation of the flap 8 is allowed, the return of which from the open position is assisted by the restoring force (emanating from the spring force $F_F$) of the restoring spring. For this reason, at least one restoring spring configured as a tension spring is attached, for example, to the individual spring hinge 19, for which reason the flap 8 in its vertically inclined position is returned in self-regulating manner by the spring restoring effect into a position which is inclined with respect to the flap closed position or into a position approaching this, due to a reduced flow of ambient air entering the opening region 6, if the internal air pressure ($p_1$) increases and approaches ambient air pressure ($p_a$). Otherwise, this flap 8 is returned in a self-regulating manner by the spring restoring effect into its rest position also as a result of a declining flow of ambient air entering the opening region 6, the decline (reduction) of which decreases until this air flow fails to enter the opening region 6 if the internal air pressure $p_i$ achieves an increase which is greater than or equal to the ambient air pressure $p_a$.

To supplement the observations made in respect of FIG. 6 (a plan view of the NACA submerged air inlet region with integrated flap 8) and of FIG. 9 (perspective view with the emphasised valve components), FIG. 7 shows the sectional line A-A according to FIG. 6 (for a side view of the air intake valve 2 according to FIG. 6 in a closed position) and FIG. 7 shows the sectional line A-A according to FIG. 6 (for a side view of the air intake valve 2 according to FIG. 6 in an open position).

According to FIGS. 6, 8 and 9, in its rest position, with its flap surface closing flat on the outer skin surface, the air intake valve 2 will completely close a scoop in the NACA shape, located in the fuselage outer skin 15. When this valve is opened, ambient air 3 flows over the downstream transverse edge of the second transverse side 11 located on the rear edge and which, considered in terms of flow technology, is a dynamic edge, but also flows over the longitudinal sides 13, 14 of the side frame 16. The valve opening or the incline of the flap 8 (with respect to a position corresponding to FIG. 7) is controlled by the force equilibrium consisting of spring force $F_F$, differential pressure $\Delta p$ and aerodynamic forces $\Sigma F_{pi}$, $\Sigma F_{pa}$.

Figure 10:
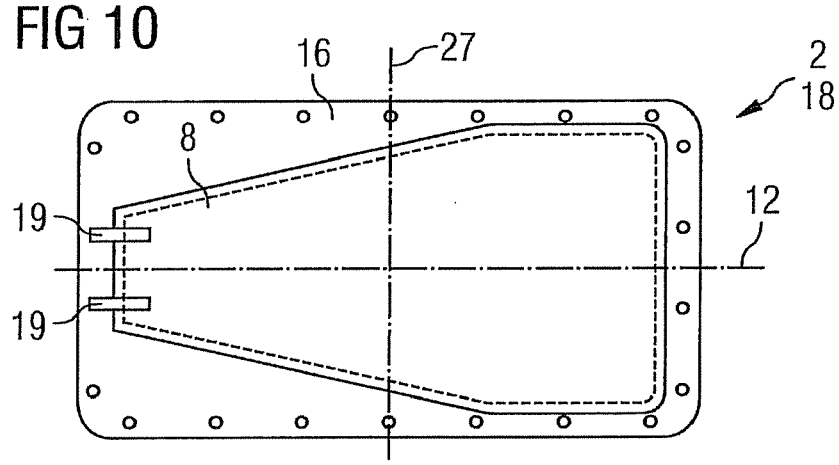
FIG. 10 is a plan view of the air intake valve according to FIG. 6 without showing wall boundaries installed around the edges of the NACA opening region.

FIG. 10 is very similar to the plan view according to FIG. 6, since there are no further wall boundaries to be inferred from this illustration. These wall boundaries will not be shown until FIG. 11.

These wall boundaries 22, 23, 24 are attached along the periphery of the framing of the side frame in a perpendicular position on the side edges, directed towards the opening region 6 of the NACA submerged air inlet 18, of the transverse and longitudinal sides 10, 11, 13, 14, i.e. below the side frame 16. The region of the NACA submerged air inlet 18 adjoining the front portion 9 remains excluded from this. A first wall boundary 22 is arranged according to the course of the fuselage transverse axis 27, while two further similar wall boundaries 23, 24 extend in the direction of the fuselage longitudinal axis 12. These wall boundaries 22, 23, 24 have the shape of a rectangular side wall, the respective broadside edges of which are attached in this region, insofar as they are opposite one another and contact one another. Accordingly, the flap 8 is either arranged to be freely movable inside the opening region enclosed by the wall boundaries as a function of the force conditions acting thereon in an air pressure-loading manner, or the flap 8 is positioned during its rest position inside this opening region which is enclosed by the side frame 16. In this respect, the edge of the flap 8 is preferably resting on the sealing attachment 17 which is strip-shaped and is attached to the longitudinal and transverse sides (10, 11, 13, 14) of the side frame 16. Accordingly, the scoop in the NACA shape located in the aircraft skin, is delimited by the wall boundaries 22, 23, 24. The ambient air 3 flows in over the dynamic edge of the valve.

Figure 11:
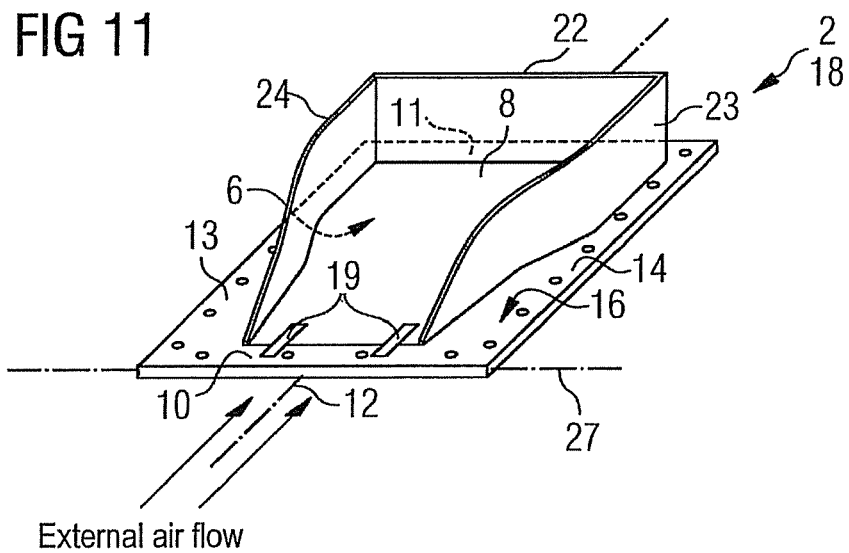
FIG. 11 shows the air intake valve according to FIG. 10 with a depiction of wall boundaries installed (perpendicularly in the direction of the NACA opening region)
Figure 12:
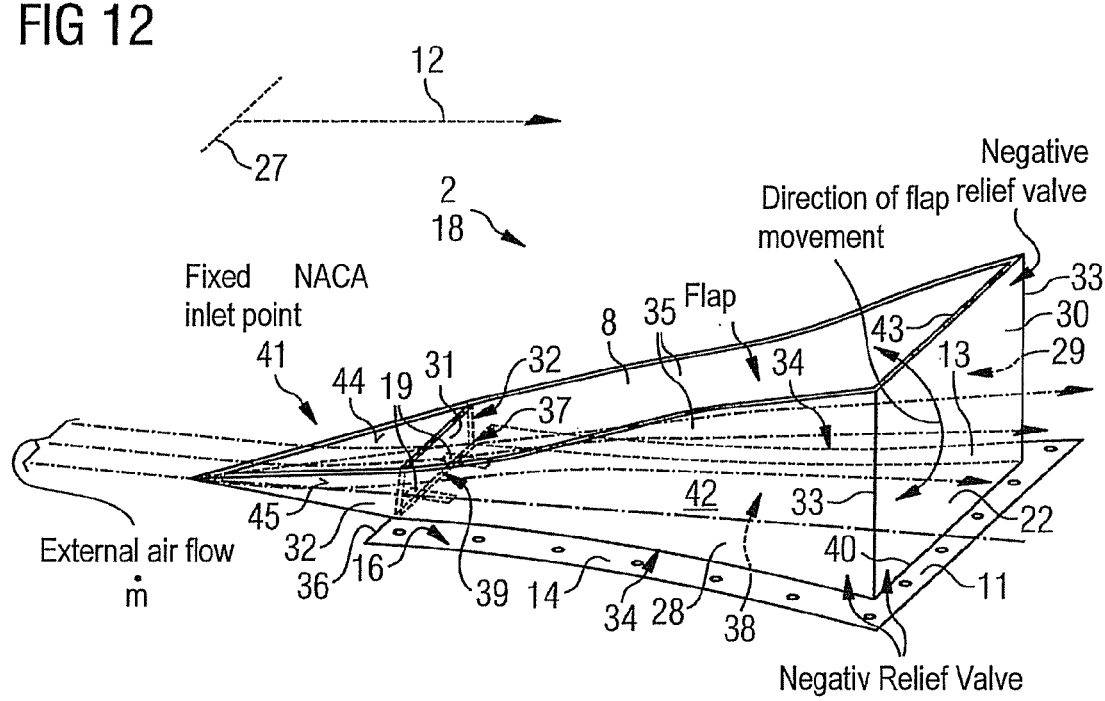
FIG. 12 shows a complete NACA submerged air inlet in which a flow-optimised air inlet valve is installed.

FIG. 12 shows a complete NACA submerged air inlet 18 with an installed air intake valve 2. The construction thereof is similar to that shown in FIG. 11. The differences compared to FIG. 11 are confined to the following exchange of elements:
a) replacement of the second wall boundary 23 by a trapezoidal side plate 28;
b) replacement of the third wall boundary 24 by a trapezoidal side plate 29;
c) removal of the first wall boundary 22 without replacement; and
d) peripheral attachment of a rectangular base plate 38 to the free side edges of the transverse and longitudinal sides 10, 11, 13, 14 of the side frame boundary.

The two parallel sides 32, 33 (base lines) of the two side plates 28, 29 have different lengths and are arranged standing perpendicularly on a first non-parallel side 34 at the beginning and end of said first non-parallel side 34. The second non-parallel side 35 of these side plates 28, 29 is connected to the remaining free ends of the two parallel sides 32. Insofar as the description is based on the example of the trapezoidal plate shape of the side plates 28, 29, it is also pointed out that accordingly a respective first side plate 28 is attached by its first non-parallel side 34 to the free side edge of the second longitudinal side 14. Applied accordingly, a second side plate 29 is attached by its first non-parallel side 34 to the free side edge of the first longitudinal side 13.

Attached to a first parallel side 32 of the two side plates 28, 29 which is shorter compared to the second parallel side 33, and to the remaining front edge transverse side edge 36, 37 of the two longitudinal sides 13, 14 of the side frame 16 which are unattached (for the time being) due to the lacking installation, according to the example, of the first transverse side 10 of the side frame 16 and the edge path of which corresponds to that of a first wide edge 39 of the base plate 38, and likewise attached to this first wide edge 39 (of the base plate 38) is a so-called "fixed NACA inlet point" 41 which has a pyramid-like shape, by the respective side edges of the present pyramid side faces which enclose a held-open rectangular cross section of the pyramid base. The region, arranged next to the base plate 38, of a pyramid side face 45 is preferably also held open, through which the ambient air 3 (particularly only in parts) is guided over the NACA inlet point 41 and into the held-open rectangular cross section of the pyramid base (respectively the same size rectangular cross section the mentioned opening 31) and is further conveyed into the transit air volume region 42 contained by the side plates 28, 29 and the base plate 38 which in the direction of the fuselage internal region 7 (not shown), the opening 30 which at the end of the two second parallel sides 33 (having an extended length), the remaining free ends of which is stabilised by a third transverse side 43 on the rear edge connecting these (ends) leaves the construction formed (initially without a flap) from the side plates 28, 29 and the base plate 38.

By means of the NACA submerged air inlet 18 according to FIG. 12 and the flap 8 which is still to be completed, the air intake valve 2 is optimised in terms of flow and can operate in a self-regulating manner. This flap 8 is also attached to two spring hinges 19 which are positioned on the edge and close to the held-open rectangular cross section of the pyramid base on a closed pyramid side face 44 which is located opposite the open cross section of the pyramid side face 45. If the flap 8 is in its rest position with cabin excess air pressure or equalised air pressure conditions, its (unattached) flap edges are parallel to the second non-parallel sides 35 and the third transverse side 43. If low pressure prevails in the cabin, the flap 8 moves in the direction of the mentioned base plate 35. Otherwise, the flap 8 rests with its unattached flap edge (opposite the flap edge attached to the hinge) on the base plate 35. This latter measure influences in a self-regulating manner an initially partial blocking of the passage direction of the flow of ambient air guided through this NACA submerged air inlet 18.

Finally, it is mentioned that the NACA shape is preferably integrated plastically into the surface of the aircraft. The flap 8, which operates as a function of differential pressure, of the air intake valve 2 (configured as a negative relief valve) is only one part of this presented NACA submerged air inlet 18 with a fixed NACA inlet point.

Figure 13:
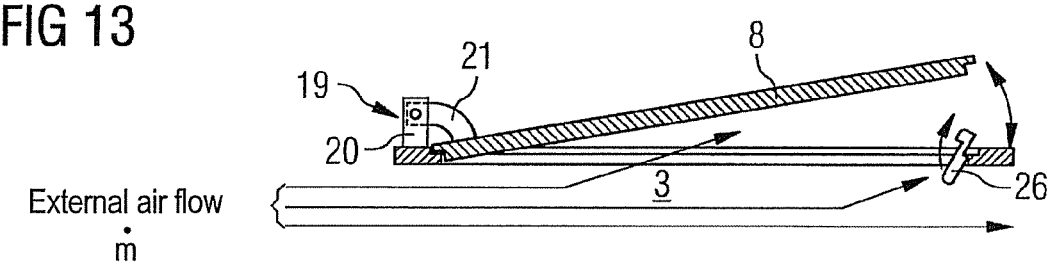
FIG. 13 is a side view of the air intake valve according to FIG. 7 with an additionally installed ancillary flap (on the dynamic edge of the air intake valve)
Figure 14:
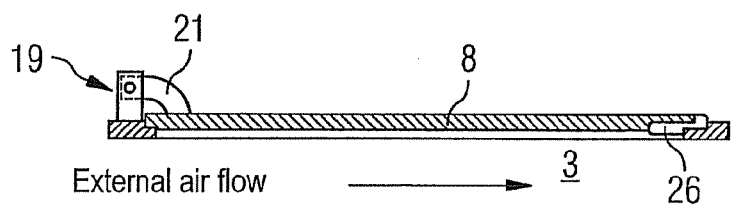
FIG. 14 is a side view of the air intake valve according to FIG. 8 with an additionally installed ancillary flap (on the dynamic edge of the air intake valve)
Figure 15:
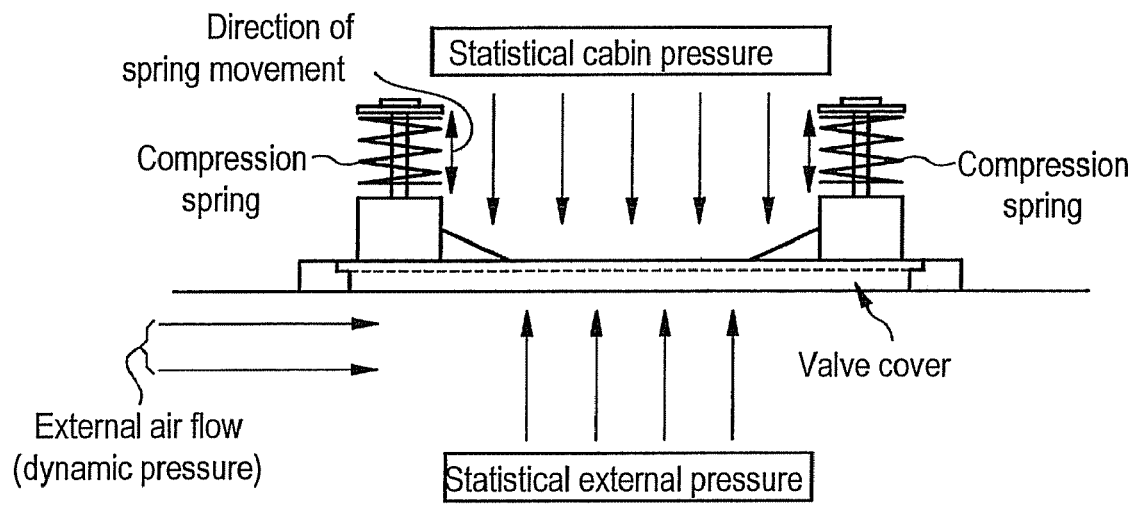
FIG. 15 is a side view of an air pressure equalising valve according to the invention.
Figure 16:
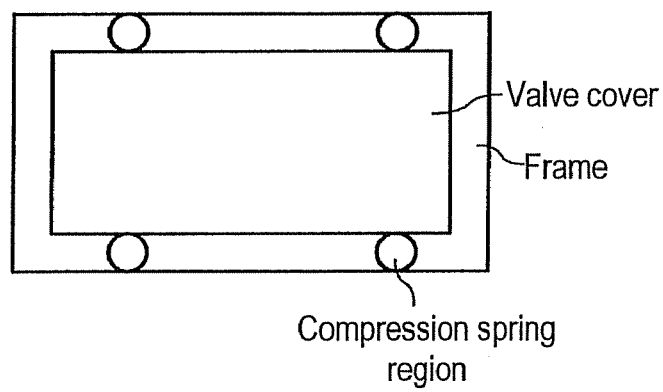
FIG. 16 is a plan view of the air pressure equalising valve of the invention according to FIG. 15.

According to FIGS. 13 and 14, an NACA submerged air inlet 18 fitted with the air intake valve 2 is shown according to the example of FIGS. 7 and 8 and is supplemented by an ancillary flap 26. According thereto, this ancillary flap 26 is shown in an open position according to FIG. 13 and in a closed position according to FIG. 14.

The ancillary flap 26 is attached to the second transverse side 11 (looking at FIG. 6 which correlates with FIGS. 7 and 8). The flap edge, (likewise) mounted in a rotationally movable manner, of the ancillary flap 26 is arranged on the longitudinal side region, directed towards the opening region 6, of the transverse side 11, the surface of the ancillary flap 26 being configured pivotally in the direction of the outer region of the aircraft fuselage outside the opening region 6. By means of the ancillary flap 26, it is possible for additional ambient air 3 or fuselage external air to be guided into the opening region 6, assuming that the ancillary flap 26 is in its pivoted-out position.

If the flap 8 is returned into its rest position, the ancillary flap 26 is pivoted back into a horizontal flap position. The cross section thereof accordingly becomes a component of the flap cross section which effectively seals the opening region 6 in an airtight manner. For this reason, the recesses 25 in the flap 8 (used in this situation as the main flap) are adapted to the flap cross section of the ancillary flap 26 in the non-pivoted position. Furthermore, the surface of the ancillary flap 26 can be covered with a sealing material coating, otherwise the aforementioned sealing attachment 17 is positioned such that in its rest position, the so-called main flap provides an effective seal against external air 3 to prevent it from penetrating inside the opening region 6.

There is therefore a small ancillary flap 26 which is additionally fitted to the dynamic edge of this air intake valve 2 and which, when the (so-called) main flap is opened, pivots outwards (i.e. in the direction of the external environment of the aircraft fuselage) and guides additional quantities of external air 3 into the aircraft fuselage (in the region of the NACA submerged air inlet 18).

Figure 17:
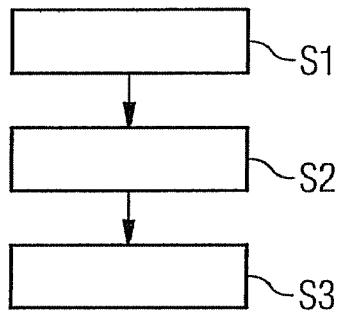
FIG. 17 is a schematic flow chart of a diagram of an embodiment of the method according to the invention.

FIG. 17 shows a schematic flow chart of an embodiment of a method according to the invention for the production of an air intake valve 2 for an aircraft.

In the following, the method according to the invention will be explained on the basis of the block diagram in FIG. 17 with reference to FIGS. 3 to 5. The method of the invention according to FIG. 17 has the following steps S1 to S3:

Step S1:
An opening region 6 is provided for letting ambient air 3 through into a fuselage inner region 7 of the aircraft.

Step S2:
A flap 8 is arranged over the opening region 6 for opening and closing said opening region 6.

Step 3:
The shape of the opening region 6 and of the class 8 is configured in each case such that it is capable of forming air vortices on edges 4 of the opening region 6 when ambient air 3 flows through the air intake valve 2.

Although the present invention has been described on the basis of preferred embodiments, it is not restricted thereto, but can be modified in many different ways.

In the following preferred embodiments of an air intake valve are given:

Embodiment 1: Air intake valve for an aircraft, comprising:
an opening region for letting ambient air through into a fuselage inner region of the aircraft,
a flap for opening and closing the opening region,
characterised in that the opening region and the flap each have a shape which is capable of forming air vortices on edges of the opening region when ambient air flows through the air intake valve.

Embodiment 2: Air intake valve according to embodiment 1, characterised in that the opening region and the flap each have an NACA shape which is capable of forming self-enlarging air vortices on the edges of the opening region when ambient air flows through the air intake valve.

Embodiment 3: Air intake valve according to at least one of the preceding embodiments, characterised in that the air intake valve is positioned in the region of an NACA submerged air inlet with which an air pressure equalisation is provided when there is an inversely-acting differential air pressure between a pressure-ventilated inner region of an aircraft fuselage which is subjected to an internal air pressure, and an NACA submerged air inlet region which is submerged lengthwise in the downstream direction of the aircraft fuselage and is arranged inside a fuselage outer skin covering the aircraft fuselage and is connected in terms of air flow to the fuselage inner region, and an atmospheric ambient air pressure bears down on an opening region of the NACA submerged air inlet on the inlet side of the NACA submerged air inlet region, which opening region is restricted by a side frame and which is covered by the flap in the rest position, the flap closing the opening region, if the ambient air pressure is greater than the internal air pressure.

Embodiment 4: Air intake valve according to at least one of the preceding embodiments, characterised in that the flap is attached to a first transverse side of the side frame which is disposed transversely to the fuselage longitudinal axis upstream of the aircraft fuselage, which flap is mounted rotatably in the region of the attachment site.

Embodiment 5: Air intake valve according to embodiment 4, characterised in that the attachment site can be moved, as a function of the force conditions acting thereon in a manner applying air pressure, relative to the opening region connected to the fuselage inner region at the outlet of the NACA submerged air inlet region.

Embodiment 6: Air intake valve according to embodiment 5, characterised in that a flow-optimised and self-regulating air intake valve function can be implemented by means of the opening region while utilising the air vortices, arising on the ramp-side cutout edges of the NACA submerged air inlet region, of the external air which partially flows into the NACA submerged air inlet region, the air vortices continuing on the edge of the flap.

Embodiment 7: Air intake valve according to at least one of the preceding embodiments, characterised in that the air intake valve is configured as an independent air intake valve.

Embodiment 8: Air intake valve according to at least one of the preceding embodiments, characterised in that the opening region of the NACA submerged air inlet is closed in a gas-tight manner by the flap which covers it in the rest position, when the internal air pressure is greater than or equal to the ambient air pressure, otherwise when there is a fuselage low air pressure compared to the ambient air pressure, the opening region of the submerged air inlet is unblocked to allow the throughflow of air, by the flap which is inclined with respect to the fuselage inner region, when the internal air pressure is less than the ambient air pressure, and in this situation, an air pressure equalisation takes place with respect to the fuselage inner region.

Embodiment 9: Air intake valve according to at least one of the preceding embodiments, characterised in that the side frame comprises in addition to the first transverse side a second transverse side and longitudinal sides connected to the ends of the two transverse sides, and a second transverse side which is disposed transversely to the fuselage longitudinal axis and is located downstream of the aircraft fuselage, is arranged opposite the first transverse side and is disposed adjoining a rear edge portion of the NACA submerged air inlet, furthermore a first longitudinal side and a second longitudinal side are arranged adjoining the edge portion of the NACA submerged air inlet, the side edge region thereof being mechanically connected, disposed on the left and on the right, to that of the respective transverse side, the course of the two longitudinal sides corresponding to that of the fuselage longitudinal axis, furthermore the side frame formed by the transverse and longitudinal sides is mechanically attached to the fuselage outer skin sideways of the opening region of the submerged air inlet, the transverse and longitudinal sides which are configured as planar plate or support elements being arranged outside the opening region of the submerged air inlet or slightly covering it along the edges, and the contour of which being adapted to the contour path of the fuselage outer skin, and which include the cross section of the opening region of the submerged air inlet.

Embodiment 10: Air intake valve according to at least one of the preceding embodiments, characterised in that the resting flap which, in this state, is arranged in a position covering the opening region of the NACA submerged air inlet is positioned pressing against a strip-like sealing attachment which is directed towards the NACA submerged air inlet opening and is attached resting on the side portion, directed towards the fuselage inner region, of the transverse and longitudinal sides and is likewise positioned in an absolutely sealing manner against an external air flow surrounding the fuselage, the flap which is located in the rest position and closes a lengthwise submerged duct inlet of the NACA submerged air inlet being arranged in planar manner with respect to the surface of the fuselage outer skin.

Embodiment 11: Air intake valve according to at least one of the preceding embodiments, characterised in that the transverse and longitudinal sides are replaced by side edges of the fuselage outer skin which are attached sideways of the submerged air inlet opening.

Embodiment 12: Air intake valve according to at least one of the preceding embodiments, characterised in that at least one spring hinge is attached to the first transverse side, a first hinge portion being attached to the first transverse side and a second hinge portion mounted rotatably with respect to the first hinge portion can be moved inclined in a vertical direction to the bevel of the base of the NACA submerged air inlet, to the edge of which the flap is attached.

Embodiment 13: Air intake valve according to at least one of the preceding embodiments, characterised in that a plurality of spring hinges which are arranged transversely to the fuselage longitudinal axis and are in a mutual spacing are attached to the first transverse side, the attachment of the edge of the flap which runs transversely to the fuselage longitudinal axis to two spring hinges sufficing with a relatively small width.

Embodiment 14: Air intake valve according to at least one of the preceding embodiments, characterised in that a hinge angle excursion which is included by the second hinge portion in a vertically open hinge position compared to the first hinge portion is restricted by the spring path of at least one restoring spring, the respective spring end of which is attached to the individual hinge portion.

Embodiment 15: Air intake valve according to at least one of the preceding embodiments, characterised in that attached to the individual spring hinge is at least one restoring spring configured as a tension spring, for which reason the flap in a vertically inclined position is returned in a self-regulating manner by the spring restoring force into a position which is inclined with respect to the flap closed position or is approaching this as a result of a reduced flow of ambient air entering the opening region if the internal air pressure increases and approaches the ambient air pressure, the flap otherwise being returned in a self-regulating manner by the spring restoring effect into its rest position as the result of a further decreasing flow of ambient air which enters the opening region, the quantitative flow reduction of which decreasing until this air flow does not appear in the opening region if the internal air pressure achieves an increase which is greater than or equal to the ambient air pressure.

Embodiment 16: Air intake valve according to embodiment 9, characterised in that attached to the edge of the two longitudinal sides of the side frame is a respective wall boundary which is directed towards the bevel of the base of the NACA submerged air inlet and is attached perpendicularly to the side edges, directed towards the opening region of the NACA submerged air inlet, of the longitudinal sides.

Embodiment 17: Air intake valve according to embodiment 16, characterised in that a first wall boundary is attached to the edge of the first longitudinal side and a second wall boundary is attached to the edge of the second longitudinal side which are both arranged under the side frame.

Embodiment 18: Air intake valve according to at least one of the preceding embodiments, characterised in that the flap
a) is arranged such that it can move freely inside the part of the opening region enclosed by the wall boundaries under the side frame, or
b) is located, while in its rest position, inside the part of the opening region enclosed by the side frame, the edge of the flap resting on a sealing attachment which is strip-shaped and is attached to the longitudinal and transverse sides of the side frame, as a function of the force conditions acting to load air pressure on the flap surface.

Embodiment 19: Air intake valve according to at least one of the preceding embodiments, characterised in that strip-shaped recesses adapted to the shape of the sealing attachment are removed from the edge of the flap, for which reason the flap is arranged such that it terminates in planar manner with the fuselage outer skin in its rest position.

Embodiment 20: Air intake valve according to at least one of the preceding embodiments, characterised in that the first and second wall boundaries are each configured as a side wall with a rectangular wall surface, a web preferably being attached to the perpendicularly spaced free ends of the respective broadside edges of the wall boundaries which face the opening at the outlet of the NACA submerged inlet region and are arranged downstream of the NACA submerged inlet region, the web and the broadside edges enclosing an open region delimited by the second transverse side.

Embodiment 21: Air intake valve according to embodiment 20, characterised in that the side walls standing perpendicularly in the direction of the fuselage longitudinal axis are used as air guiding wall elements.

Embodiment 22: Air intake valve according to at least one of the preceding embodiments, characterised in that the sealing attachment is a sealing strip, the contact region of which directed towards the incline of the base of the NACA submerged inlet region is configured to be firmly adhesive, which is attached, preferably adhesively bonded to the transverse and longitudinal sides of the side frame on their contact surface directed towards the opening region.

Embodiment 23: Air intake valve according to at least one of the preceding embodiments, characterised in that the transverse and longitudinal sides of the side frame enclose an NACA-geometric cross-sectional shape of the opening region corresponding to the duct inlet surface of the NACA submerged inlet region, and the planar surface of the flap is adapted with the sides conforming to this NACA geometric shape, based on which self-enlarging air vortices or pairs of air vortices, so-called edge vortices or pairs of edge vortices, form on the side edges of the transverse and longitudinal sides which face the NACA geometric cross section of the opening region, while partial quantities of ambient air passing downstream of the NACA submerged inlet region flow in with an inclined flap position during the air pressure equalisation which is taking place, if the opening region is cleared by the inclined flap position, an increase in the air vortices or in the pairs of air vortices occurring by a further supply of ambient air which flows in over the side edges, thereby producing an increased air throughput of the inflowing ambient air through the NACA submerged inlet.

Embodiment 24: Air intake valve according to at least one of the preceding embodiments, characterised in that attached to the second transverse side is an ancillary flap, the rotatably mounted flap edge of which is arranged on the longitudinal side region, directed towards the opening region, of the transverse side, it being possible for the surface of the ancillary flap to be pivoted in the direction of the fuselage outer region as far as outside the opening region, by which, in its pivoted-out position, ambient air can be additionally guided into the opening region.

Embodiment 25: Air intake valve according to at least one of the preceding embodiments, characterised in that the recesses in the flap are adapted to the cross section of the ancillary flap in its unpivoted position.

Embodiment 26: Air intake valve according to at least one of the preceding embodiments, characterised in that the first transverse side is positioned next to a peripherally adjacent front edge portion of the NACA submerged inlet which is located at the start of the developing bevel of the base, submerged with respect to the fuselage inner region, of the NACA submerged inlet.

Embodiment 27: Method for the production of an air intake valve for an aircraft, with the following steps:

provision of an opening region for letting ambient air through into a fuselage inner region of the aircraft, arrangement of a flap above the opening region for opening and closing the opening region, characterised by the formation of the shape of the opening region and of the flap in each case such that the flap is capable of forming air vortices on edges of the opening region when ambient air flows through the air intake valve.

LIST OF REFERENCE NUMERALS 1 submerged air inlet
2 air intake valve
3 ambient air
4 cutout edges [of the (NACA) submerged air inlet 1]; ramp edges; edges
5 air vortices (pairs)
6 opening region (of the submerged air inlet 1)
7 inner region of fuselage
8 flap
9 portion, on the front edge (of the submerged air inlet 1)
91 portion, on the rear edge (of the submerged air inlet 1)
92 portion, on the sideways edge (of the submerged air inlet 1)
93 portion, on the sideways edge (of the submerged air inlet 1)
10 transverse side, on the front (edge)
11 transverse side, on the rear (edge)
12 longitudinal axis of fuselage
13 longitudinal side
14 longitudinal side
15 outer skin of fuselage
16 side frame
17 sealing attachment; sealing strip
18 NACA submerged air inlet
19 spring hinge
20 hinge portion, first
21 hinge portion, second
22 wall boundary, first
23 wall boundary, second
24 wall boundary, third
25 recess, on the edge, strip-shaped (of the edge of flap 8)
26 ancillary flap, mounted rotatably
27 fuselage transverse axis
28 side plate, first; trapezoidal
29 side plate, second; trapezoidal
30 opening
31 opening
32 parallel side, first (of the trapezoidal side plates 28, 29)
33 parallel side, second (of the trapezoidal side plates 28, 29)
34 non-parallel side, first (of the trapezoidal side plates 28, 29)
35 non-parallel side, second (of the trapezoidal side plates 28, 29)
36 front edge transverse side edge (of longitudinal side 14)
37 front edge transverse side edge (of longitudinal side 13)
38 base plate
39 wide edge, first (of base plate 38)
40 wide edge, second (of base plate 38)
41 fixed NACA inlet point
42 transit air volume region
43 rear edge transverse side, third
44 pyramid side face, closed (closed cross-sectional surface)
45 pyramid side face, open (open cross-sectional surface)
$p_i$ internal air pressure
$p_a$ ambient air pressure
$\Delta p$ differential air pressure
$F_{pi}$ air pressure force of the internal air pressure
$F_{pa}$ air pressure force of the ambient air pressure
$F_F$ spring force of the restoring spring
$A_{flap}$ flap surface (of flap 8)
$\dot{m}$ mass (air) throughput
cabin cabin (region)
ambient atmosphere (aircraft environment)

The invention claimed is:

1. An air intake valve for an aircraft, comprising:
an opening region for letting ambient air through into a fuselage inner region of the aircraft,
a flap for opening and closing the opening region, wherein the opening region and the flap each have a shape which forms air vortices on edges of the opening region when ambient air flows through the air intake valve,
the flap being attached upstream of the aircraft fuselage to a first transverse side of a side frame which is disposed transversely to the fuselage longitudinal axis, which flap is mounted rotatably in the region of the attachment site,
an ancillary flap being attached to a second transverse side, the rotatably mounted edge of said ancillary flap being arranged on the longitudinal side region, directed towards the opening region, of the transverse side, such that it is possible for the surface of the ancillary flap to be pivoted in the direction of the fuselage outer region as far as outside the opening region, by which, in the pivoted-out position of the ancillary flap, ambient air is additionally guided into the opening region, and
recesses around an outer edge of the flap are adapted to the cross section of the ancillary flap in the unpivoted position of the ancillary flap.

2. The air intake valve according to claim 1, wherein the air intake valve is positioned in the region of a National Advisory Committee for Aeronautics (NACA) submerged air inlet with which an air pressure equalization is provided when there is an inversely-acting differential air pressure between a pressure-ventilated inner region of an aircraft fuselage which is subjected to an internal air pressure, and an NACA submerged air inlet region which is submerged lengthwise in the downstream direction of the aircraft fuselage and is arranged inside a fuselage outer skin covering the aircraft fuselage and is connected in terms of air flow to the fuselage inner region, and an atmospheric ambient air pressure bears down on an opening region of the NACA submerged air inlet on the inlet side of the NACA submerged air inlet region, which opening region is restricted by a side frame and which is covered by the flap in the rest position, the flap opening the opening region, if the ambient air pressure is greater than the internal air pressure, otherwise the flap closing the opening region.

3. The air intake valve according to claim 1, wherein the attachment site can be moved, as a function of the force conditions acting thereon in a manner applying air pressure, relative to the opening region connected to the fuselage inner region at the outlet of a NACA submerged air inlet region.

4. The air intake valve according to claim 3, wherein a flow-optimized and self-regulating air intake valve function can be implemented by means of the opening region while utilizing the air vortices, arising on the ramp-side cutout edges of a NACA submerged air inlet region, of the external air which partially flows into the NACA submerged air inlet region, the air vortices continuing on the edge of the flap.

5. The air intake valve according to claim 1, wherein the air intake valve is configured as an independent air intake valve.

6. The air intake valve according to claim 1, wherein the opening region of a NACA submerged air inlet is closed in a gas-tight manner by the flap which covers the NACA submerged air inlet in the rest position, when the internal air pressure is greater than or equal to the ambient air pressure, otherwise when there is a fuselage low air pressure compared to the ambient air pressure, the opening region of the submerged air inlet is unblocked to allow the throughflow of air by the flap which is inclined with respect to the fuselage inner region, when the internal air pressure is less than the ambient air pressure, and in this situation, an air pressure equalization takes place with respect to the fuselage inner region.

7. The air intake valve according to claim 1, wherein the side frame comprises in addition to the first transverse side a second transverse side and longitudinal sides connected to the ends of the two transverse sides, and a second transverse side which is disposed transversely to the fuselage longitudinal axis and is located downstream of the aircraft fuselage, is arranged opposite the first transverse side and is disposed adjoining a rear edge portion of a NACA submerged air inlet, furthermore a first longitudinal side and a second longitudinal side are arranged adjoining the edge portion of the NACA submerged air inlet, the side edge region being mechanically connected, disposed on the left and on the right, to that of the respective transverse side, the course of the two longitudinal sides corresponding to that of the fuselage longitudinal axis, furthermore the side frame formed by the transverse and longitudinal sides is mechanically attached to the fuselage outer skin sideways of the opening region of the submerged air inlet, the transverse and longitudinal sides which are configured as planar plate or carrier elements being arranged outside the opening region of the NACA submerged air inlet or slightly covering the NACA submerged air inlet along the edges, and the contour of which being adapted to the contour path of the fuselage outer skin, and which include the cross section of the opening region of the submerged air inlet.

8. The air intake valve according to claim 1, wherein the resting flap which, in this position, is arranged in a position covering the opening region of a NACA submerged air inlet and is positioned pressing against a strip-like sealing attachment which is directed towards the NACA submerged air inlet opening and is attached resting on the side portion, directed towards the fuselage inner region, of the transverse and longitudinal sides and is likewise positioned in an absolutely sealing manner against an external air flow surrounding the fuselage, the flap which is located in the rest position and closes a lengthwise submerged duct inlet of the NACA submerged air inlet being arranged in planar manner to the surface of the fuselage outer skin.

9. The air intake valve according to claim 1, wherein the transverse and longitudinal sides are replaced by side edges of the fuselage outer skin which are attached sideways of the submerged air inlet opening.

10. The air intake valve according to claim 1, wherein at least one spring hinge is attached to the first transverse side, a first hinge portion being attached to the first transverse side and a second hinge portion mounted rotatably with respect to the first hinge portion can be moved inclined in a vertical direction perpendicular to the bevel of the base of a NACA submerged air inlet, to the edge of which the flap is attached.

11. The air intake valve according to claim 1, wherein a plurality of spring hinges which are arranged transversely to the fuselage longitudinal axis and are in a mutual spacing are attached to the first transverse side, the attachment of the edge of the flap which runs transversely to the fuselage longitudinal axis to two spring hinges sufficing with a relatively small width.

12. The air intake valve according to claim 1, wherein a hinge angle excursion which is included by the second hinge portion in a vertically open hinge position compared to the first hinge portion is restricted by the spring path of at least one restoring spring, the respective spring end of which is attached to the individual hinge portion.

13. The air intake valve according to claim 1, wherein attached to an individual spring hinge is at least one restoring spring configured as a tension spring, for which reason the flap in a vertically inclined position is returned in a self-regulating manner by the spring restoring force into a position which is inclined with respect to the flap closed position or is approaching this as a result of a reduced flow of ambient air entering the opening region, if the internal air pressure increases and approaches the ambient air pressure, the flap otherwise being returned in a self-regulating manner by the spring restoring effect into the rest position of the flap as the result of further decreasing flow of ambient air which enters the opening region, the quantitative flow reduction of which decreasing until this air flow does not appear in the opening region, if the internal air pressure achieves an increase which is greater than or equal to the ambient air pressure.

14. A method for the production of an air intake valve for an aircraft, comprising: provision of an opening region for letting ambient air through into a fuselage inner region of the aircraft,
   arrangement of a flap above the opening region for opening and closing the opening region,
   formation of the shape of the opening region and of the flap in each case such that they are capable of forming air vortices on edges of the opening region when ambient air flows through the air intake valve,
   wherein the flap is attached to a first transverse side of the side frame which is disposed transversely to the fuselage longitudinal axis, upstream of the aircraft fuselage, which flap is mounted rotatably in the region of the attachment site,
   an ancillary flap being attached to a second transverse side, the rotatably mounted edge of said ancillary flap being arranged on the longitudinal side region, directed towards the opening region, of the transverse side, such that it is possible for the surface of the ancillary flap to be pivoted in the direction of the fuselage outer region as far as outside the opening region, by which, in the pivoted-out position of the ancillary flap, ambient air can be additionally guided into the opening region, and
   recesses around an outer edge of the flap are adapted to the cross section of the ancillary flap in the unpivoted position of the ancillary flap.

* * * * *